United States Patent [19]

Yamaguchi

[11] Patent Number: 4,953,470

[45] Date of Patent: Sep. 4, 1990

[54] ATTRACTION TYPE MAGNETIC LEVITATION VEHICLE SYSTEM

[75] Inventor: Hitoshi Yamaguchi, Kawasaki, Japan

[73] Assignee: Fuji Electric Co., Ltd., Kanagawa, Japan

[21] Appl. No.: 276,353

[22] Filed: Nov. 25, 1988

[30] Foreign Application Priority Data

Dec. 29, 1987 [JP] Japan .................. 62-335389

[51] Int. Cl.⁵ .................. B60L 13/04; H02K 41/00
[52] U.S. Cl. .................. 104/282; 104/286; 318/135
[58] Field of Search ........ 104/281, 282, 286, 290–294, 104/284; 318/135

[56] References Cited

U.S. PATENT DOCUMENTS

| | | | |
|---|---|---|---|
| 3,823,672 | 7/1974 | Fellows et al. | 104/281 |
| 3,829,746 | 8/1974 | Van et al. | 318/135 |
| 3,834,318 | 9/1974 | Fellows et al. | 104/284 |
| 3,884,154 | 5/1975 | Marten | 104/282 X |
| 4,646,651 | 3/1987 | Yamamura et al. | 104/286 X |
| 4,766,358 | 8/1988 | Higuchi | 104/282 X |

FOREIGN PATENT DOCUMENTS

| | | |
|---|---|---|
| 0222938 | 5/1987 | European Pat. Off. |
| 2219154 | 4/1980 | Fed. Rep. of Germany |
| 3208380 | 1/1984 | Fed. Rep. of Germany |
| 1430761 | 4/1976 | United Kingdom ........ 104/281 |

OTHER PUBLICATIONS

Herbert Weh, "Synchroner Langstatorantrieb Mit Geregelten, Anziehend Wirkenden Normalkraften", ETZ-A 1975, vol. 9, pp. 409–413.
"Polkraftschwankungen Durch Ankernutung am Beispiel des Synchronen Langstatormotors", Archiv fur Elektrotechnik 1977, pp. 291–296.
H. Timmel, "Überblick uber Lineare Synchronmotoren", Elektrie 1980, vol. 3, pp. 118–124.
M. Hajek, "Hybrid Linear Motor", Proc. IEEE, 1978, Nr. 12, pp. 1357–1362.

*Primary Examiner*—Robert J. Oberleitner
*Attorney, Agent, or Firm*—Spencer & Frank

[57] ABSTRACT

An attraction type magnetic levitation vehicle system includes a magnetic rail laid on the side of a track and a levitation vehicle having a supporting electromagnet and a guide electromagnet each having a plurality of magnetic poles arrayed along the track. A magnetic pole surface of each of the plurality of magnetic poles is in opposing relationship to a surface of the magnetic rail, respectively. The magnetic pole surface of at least one of the supporting and guide electromagnets and the surface of the magnetic rail opposing the magnetic pole surface is in the form of a rectangular waveform having a plurality of alternating groove-and-teeth pairs arranged at a predetermined pitch. The distances from one of the plurality of magnetic poles each having the rectangular-wave-shaped magnetic pole surface of the remaining magnetic poles are staggered by less than one pitch from an integer multiple of the predetermined pitch. Exciting currents flowing in pulses through exciting coils of the plurality of magnetic poles are controlled to increase in predetermined timing and order, thereby allowing thrust to be produced in the direction of the track.

3 Claims, 5 Drawing Sheets

ATTRACTION TYPE MAGNETIC LEVITATION VEHICLE SYSTEM

BACKGROUND OF THE INVENTION

1. Field of the Invention

The present invention relates to a magnetic levitation vehicle system in which a vehicle is supported in a noncontact state, guided and driven by magnetic attraction forces interacting between a supporting electromagnet, a guide electromagnet and a magnetic rail.

2. Description of the Prior Art

FIG. 5 is a sectional view of a conventional magnetic-levitation vehicle and a magnetic rail. Supporting electromagnets 5 with their magnetic poles directed upwardly and guide electromagnets 4 with their magnetic poles directed horizontally are mounted on a chassis 3 of a vehicle 1 in symmetrical relationship with the centerline of the chassis 3. On either side of a track 8, magnetic rails 6 are mounted on both sides of a cross beam 7 in such a way that rail surfaces are directed downwardly and transversely, respectively. When the currents respectively made to flow through the electromagnets 4 and 5 are suitably controlled, the chassis 3 is a levitated and guided in noncontact state while the electromagnets 4 and 5 maintain an opposing and spaced-apart relationship with the magnetic rails 6, respectively. Thrust imparted to the vehicle 1 is produced by electromagnetic energy interacting between armatures 9 of linear induction motors mounted on the chassis 3 and secondary rails 10 of the track 8. The secondary rail 10 of a linear induction motor is used which in general include a steel sheet whose upper surface is laminated or otherwise joined with a sheet of electrically conductive material such as aluminum.

The conventional liner induction motor for a magnetic-levitation vehicle or car involves a cost for attaching the secondary rail 10, such as a sheet of copper, aluminum or the like, over the surface of the magnetic rail 6 consisting of a lamination of sheets of steel.

Furthermore, the conventional linear induction motor requires costs of maintenance for eliminating electrolytic corrosion between steel and a secondary conductor. Various methods are available for attaching the secondary conductor to steel, such as the explosive welding method for welding a sheet of aluminum to steel, and the method for joining them with screws. The explosive welding method is expensive, while the screw joint method has a problem in that it is difficult to prevent adverse effects caused by icing during winter. A further problem resides in the fact that the armatures 9 of the linear induction motors are mounted on the side of the vehicle 1, and therefore the weight of the vehicle is increased accordingly. The increase in weight of the vehicle not only results in increase in the cost of manufacture and maintenance but also causes increase in the cost of construction of the track.

Furthermore, like the Transrapid TR06 system developed in West Germany, in the case where linear synthronized motors (LSM), of the type in which armatures are disposed on the ground or track and supporting electromagnets mounted on a vehicle are used as field magnets, product thrust, the supporting electromagnets also function as field magnets of the LSM so that the vehicle can be made light in weight, but primary windings must be mounted on the whole track, causing the cost of construction for installation on the ground to become expensive. Moreover, even when excitation sections are switched over, an armature portion in excess of the length of the vehicle must be always excited, resulting in great energy losses. On the other hand, there have been devised and demonstrated a method in which, unlike the system as shown in FIG. 5, armatures of linear induction motors are disposed on the ground and secondary circuits are mounted on the side of a vehicle. This method can make the vehicle light in weight, but as in the case of TR06 system, the costs of construction for installation on the ground are expensive. Furthermore, even when exciting sections are switched over, an armature portion in excess of the length of the vehicle must be always excited, resulting in great energy losses.

SUMMARY OF THE INVENTION

In view of the above, a primary object of the present invention is to provide a magnetic levitation vehicle system in which a vehicle can be made light in weight and in which the cost of construction as well as the loss of power can be decreased to a minimum.

An attraction type magnetic levitation vehicle system of the type comprising a magnetic rail laid on the side of a track and a levitation vehicle having a projection type supporting electromagnet and a projection type guide electromagnet, and having a plurality of magnetic poles arrayed along the track in the direction thereof in such a way that a magnetic pole surface of each of the plurality of magnetic poles is opposed to a surface of the magnetic rail, respectively, whereby the levitation vehicle is levitated above the magnetic rail without contact therewith by magnetic attraction forces interacting between the magnetic rail and the supporting and guide electromagnets.

The magnetic pole surface of at least one of the supporting and guide electomagnets and the surface of the magnetic rail opposed to the magnetic pole surface is in the form of a rectangular waveform consisting of a plurality of alternating groove-and-teeth pairs arranged at a predetermined pitch along the track in the direction thereof.

At least one of the distances from one of the plurality of magnetic poles each having the rectangular-wave-shaped magnetic pole surface to the remaining magnetic poles is staggered or offset by less than one pitch from an integer multiple of the predetermined pitch.

Driving means controls exciting currents in the form of pulses flowing through exciting coils of the plurality of magnetic poles each having the rectangular-wave-shaped magnetic pole surface to increase in predetermined timing and order, thereby allowing thrust to be produced in the direction of the track.

Here, the driving means may be disposed on both the supporting and guide electromagnets and on the surfaces of the magnetic rail opposed to the supporting and guide electromagnets, respectively.

Relative distances of the plurality of magnetic poles each having the rectangular-wave-shaped magnetic pole surface may be staggered or offset by less than the one pitch, respectively, from an integer multiple of the predetermined pitch.

The number of the magnetic poles each having the rectangular-wave-shaped magnetic surface may be four; each of the distances between the adjacent magnetic poles may be staggered or offset by $\frac{1}{4}$ of the predetermined pitch, respectively, from an integer multiple of the predetermined pitch.

The magnetic poles each having the rectangular-wave-shaped magnetic pole surface may be four; the distance between the outermost magnetic poles may be equal to an integer multiple of the predetermined pitch while the distances between the outermost and neighboring magnetic poles may be offset by ½ of the predetermined pitch, respectively, from an integer multiple of the predetermined pitch.

The number of the magnetic poles of the guide electromagnet may be four; each of the distances between the adjacent magnetic poles may be offset by ¼ of the predetermined pitch, respectively, from an integer multiple of the predetermined pitch. The number of the magnetic poles of the supporting electromagnet may be four; the distance between the first and fourth magnetic poles may be equal to an integer multiple of the predetermined pitch while the distances between the first and second magnetic poles and between the third and fourth magnetic poles may be offset by ½ of the predetermined pitch, respectively, from an integer multiple of the predetermined pitch.

The surface of the magnetic rail extended along the track and the surfaces of a plurality of magnetic poles of the projection type electromagnets which are opposed to the surface of the magnetic rail are formed into the rectangular-wave-shape consisting of an array of alternating grooves and teeth extending in the direction of the track and at least one of the distances between one of a plurality of magnetic poles each having a rectanglar-wave-shaped surface and the remaining magnetic poles, respectively, is offset by less than one pitch from an integer multiple of the pitch. Therefore, a portion at which the teeth are in opposing relationship with each other in a gap between the surface of the magnetic rail and the surfaces of the magnetic poles has a low degree of magnetic resistance (to be referred as "reluctance" hereinafter in this specification) while a portion at which the grooves are in opposing relationship has a high degree of reluctance. In addition, the rectangular wave shapes of the magnetic pole surfaces are offset in position from one magnetic pole to another so that the reluctances between the magnetic poles become different. When direct current (DC) is supplied to flow through the exciting coils of each magnetic pole, magnetic attraction forces are produced between the magnetic rail and the electromagnets so that the electromagnets are attracted by the magnetic rail and consequently supporting forces act on the vehicle in the upward direction, or guiding forces in the horizontal direction act on the vehicle. When the current to be made flow through the exciting coils of the magnetic poles is so controlled as to increase like a pulse in predetermined timing and order, due to differences in reluctance between the magnetic poles, thrust is produced stepwise in a continuous manner in the direction in which the offsets or deviations between the teeth of the magnetic rail and the electromagnets are reduced, in sequence that is, in the direction in which the vehicle is moved along the track. It follows, therefore, that it becomes possible to provide a thrust producing device to the guide or supporting electromagnets so that thrust or drive devices such as a linear induction motor or the like can be eliminated and consequently magnetic levitation vehicles can be made light in weight. Furthermore, a secondary rail on the side of a magnetic rail can be also eliminated so that the cost of construction of the track and its associated component parts can be decreased to a minimum.

Moreover, problems of electrolyte corrosion and eddy current which causes the loss of power due to installation of a secondary conductor, can be overcome.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Now the present invention will be described with reference to its preferred embodiments.

Figure 1:
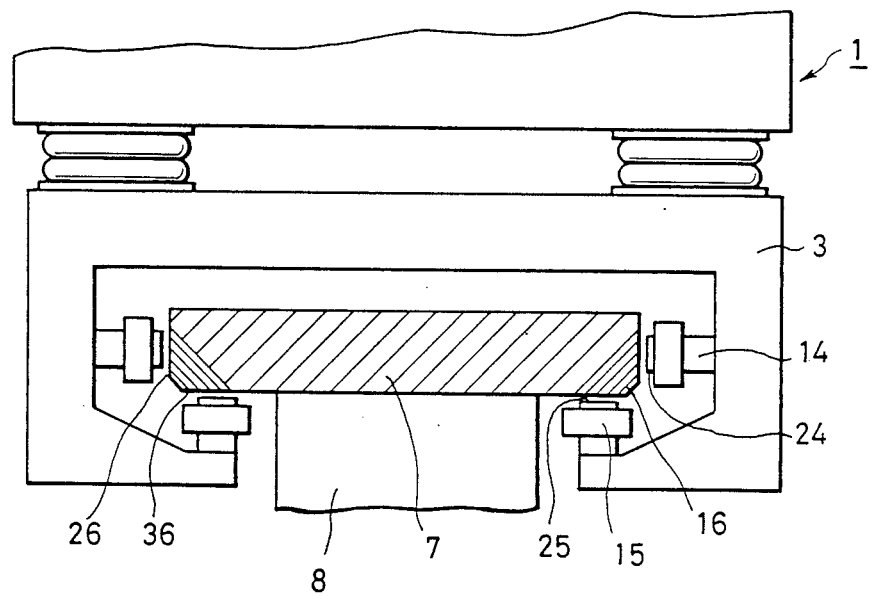
FIG. 1 is a sectional view of a preferred embodiment of the present invention.

In FIG. 1, reference numeral 14 represents a projection type guide electromagnet having a rectangular-wave-shaped magnetic pole surface; 15, a projection type supporting electromagnet having a rectangular-wave-shaped magnetic pole surface; 16, magnetic rails supported on both sides, respectively, of a cross beam 7 of a track 8. Each of the magnetic rails 16 has a transverse rectangular-wave-shaped rail surface 26 and a downwardly directed rectangular-wave-shaped rail surface 36. The guide electromagnets 14 are mounted on opposite inner sides, respectively, of a chassis 3 which is C-shaped in cross section in such a way that they are in symmetrical and opposing relationship and their magnetic pole surfaces 24 are spaced apart by a predetermined gap from the transverse rectangular-wave-shaped rail surfaces 26, respectively. The supporting electromagnets 15 are supported symmetrically with respect to the centerline of the chassis 3 in such a way that the magnetic pole surfaces 25 are maintained in opposing relationship with the downwardly-directed rail surfaces 36, respectively.

Figure 2:
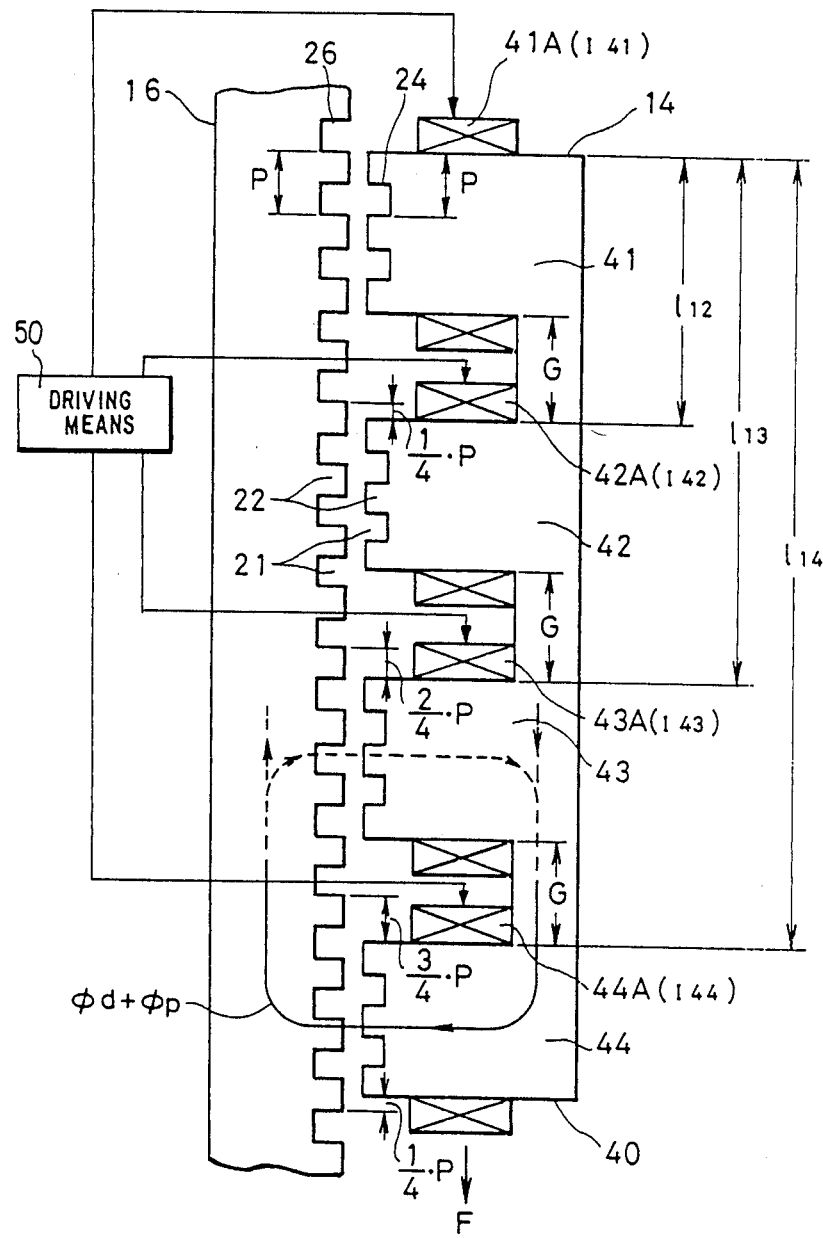
FIG. 2 is a sectional view, on enlarged scale, illustrating the major component parts thereof.

FIG. 2 shows the section in the horizontal direction of the magnetic rail 16 (not hatched). The magnetic rail 16 has a rectangular-wave-shaped rail surface portion 26 formed with a plurality of grooves 21 and teeth 22 in the direction of the track 8 at a predetermined pitch P. Each groove 21 is adjacent a tooth 22 and are discussed in the following as being paired. Each groove 21 and each tooth 22 have the same width, and the distance each pair extends along the track 8 is defined as a pitch P described above. That is, shown in FIG. 2, the teeth 22 on the track 8 having a pitch P, and the teeth 22' on the guide electromagnet 14 have an equal pitch P. The guide electromagnet 14 in opposed relationship with the magnetic rail 16 corresponding grooves 21' and teeth 22' arranged in pairs at a pitch P. The guide electromagnet 14 has a core which has, for instance in this embodiment, four magnetic poles 41, 42, 43 and 44 carrying exciting coils 41A, 42A, 43A and 44A, respectively. The pole surface of each of the magnetic poles 41–44 is in the form of rectangular waves consisting of a plurality of the groove-and-tooth pairs 21' and 22' at the same pitch P with the rectangular-wave-shaped surface portion 26 of the guide rail 16. The distance G between the adjacent magnetic poles, for instance 41 and 42 is so determined that the length $l_{12}$ between corresponding sides of the two magnetic poles 41 and 42 is equal to a multiple of the value of the pitch P, plus on offset distance equal to ¼ of the pitch P from an integer multiple to the pitch P. In like manner, a distance G exists G between the respective adjacent side portions of the magnetic poles 41-44 are so determined that a length $l_{13}$ between corresponding sides of the magnetic poles 41 and 43 is equal to a multiple of the value of the pitch P, plus an offset distance equal to 2/4 pitch P and a length $l_{14}$ between corresponding sides of the magnetic poles 41 and 44 is equal to a multiple of the value of the pitch P, plus an offset value equal to ¾ pitch P.

Figure 3:
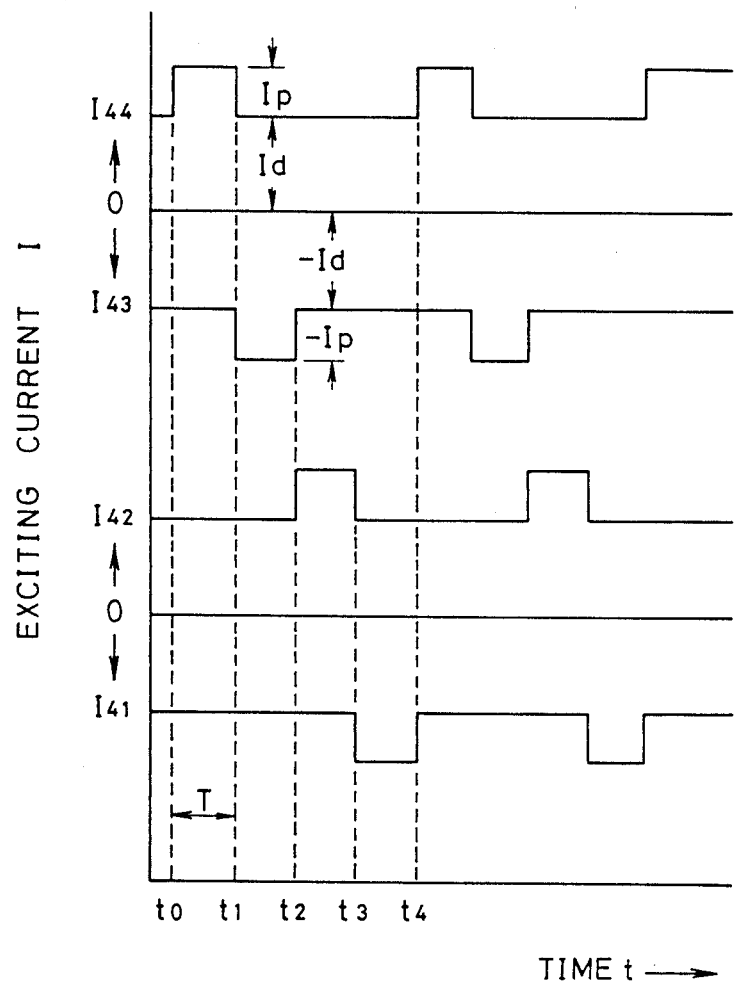
FIG. 3 shows waveforms of exciting currents.

In the case of the magnetic-levitation vehicle system with the above-described construction, exciting currents $I_{41}$, $I_{42}$, $I_{43}$ and $I_{44}$ are applied by the exciting means 50, and these currents are applied to the exciting coils 41A, 42A, 43A and 44A of the guide electromagnet 14. Each of the currents $I_{41}$-$I_{44}$ consists of the sum of a DC bias current $I_d$ for imparting guide force to the guide electromagnet 14 in the crosswise direction and a pulse current component $I_p$ for thrusting the guide electromagnet 14 in the direction of the track as shown in FIG. 3. In order to produce desired attraction forces, the direction of the flow of current $I_{43}$ is made opposite to the direction of the flow of current $I_{44}$ so that the magnetic poles 43 and 44 produce magnetic fluxes which rotate, for instance, in the clockwise direction. In like manner, the direction of the flow of current $I_{42}$ is made opposite to the direction of the flow of the exciting current $I_{41}$ so that the magnetic poles 42 and 41 produce magnetic fluxes which rotate, for instance, in the clockwise direction. The DC bias current $I_d$ is normally fed to the exciting coils 41A, 41B, 41C and 41D and the rectangular or trapezoidal waveform pulse current component $I_p$ with a pulse duration T is sequentially supplied in sequence as the exciting currents $I_{44}$, $I_{43}$, $I_{42}$ and $I_{41}$.

Referring still to FIG. 3, the thrust acting on the guide electromagnet 14 due to the exciting current will be described as follows. In FIG. 3, from $t_0$ to $t_1$ the sum $I_d+I_p$ (where $I_d$ is DC bias current and $I_p$ is pulse current component) flows through the exciting coil 44A so that magnetic flux $(\phi_d+\phi_p)$ is produced at the magnetic pole 44 and which mainly rotates about the adjacent magnetic pole 43. However, although a portion of this magnetic flux also rotates about other magnetic poles except that adjacent magnetic poles 43, the magnetic flux passing through the teeth 22' of the rectangular-wave-shaped magnetic pole surface of the magnetic pole 44 is stronger than the magnetic fluxes passing through the teeth 22' of the other magnetic poles. The thrust F acting on the guide electromagnet 14 is mainly produced at the tooth through which passes the strongest magnetic flux so that the teeth of the magnetic pole 44 produce strong thrust. As a result, the thrust F acts in the direction in which the deviation of ¼ pitch with respect to the teeth of the opposing magnetic rail 16 is corrected; that is, in the direction indicated by the arrow so that the guide electromagnet 14 is forced to be displaced. In this case, the deviation of the teeth of the magnetic pole 43 with respect to the teeth of the magnetic rail 26 is decreased to ¼ pitch. Next from $t_1$ to $t_2$ the pulse current component $-I_p$ of the exciting current $I_{43}$ is supplied so that the magnetic flux passing through the teeth of the magnetic pole 43 becomes strongest and the guide electromagnet 14 is further forced to be displaced by ¼ pitch in the direction indicated by the arrow. In the manner described above, the thrust F is repeatedly produced by the magnetic poles 42, 41, 44 and 43 in the order named so that the guide electromagnet 14 is pushed stepwise in the direction indicated by the arrow.

The direction of the thrust F is determined depending upon the direction of the deviation between the opposing teeth so that when a sensor for detecting the positions of the teeth and a control circuit which responds to an output signal from the sensor to determine the exciting coil to which is first fed the pulse current component are disposed on the side of the guide electromagnet 14, the guide electromagnet 14 or the magnetic-levitation vehicle can be moved in a desired direction.

Figure 5:
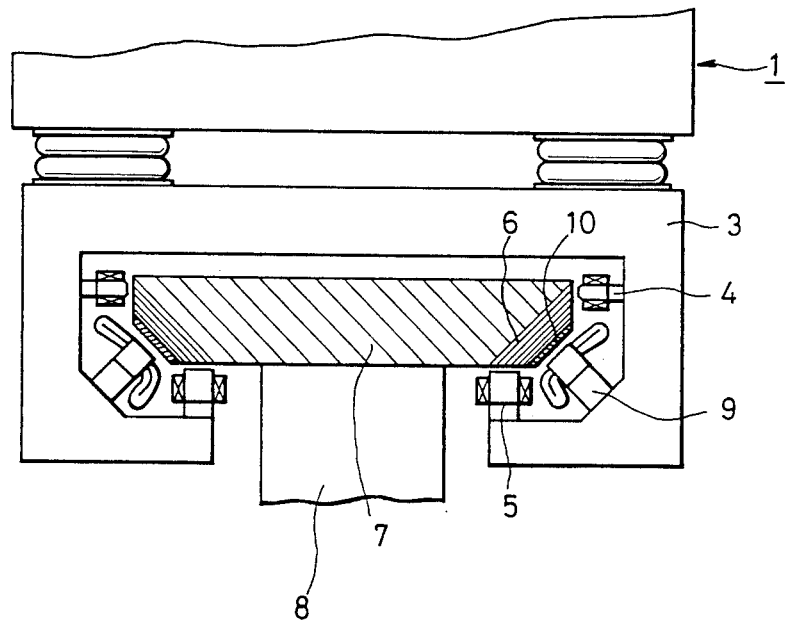
FIG. 5 is a sectional view of a conventional magnetic levitation vehicle system.

As described above, according to the first embodiment of the present invention, by a simple additional process for forming the rectangular waves consisting of a plurality of groove-and-tooth pairs at a predetermined pitch over the surfaces of the magnetic rail and the guide or supporting electromagnet and by the control of the currents which flow through the exciting coils, either or both of the guide and supporting electromagnets may have the function of a thrust generating device in addition to their own functions. It follows, therefore, that it is not required to mount the armature of a linear induction motor on a magnetic-levitation vehicle so that the latter can be made light in weight. Furthermore, the conventional secondary rail 10 as shown in FIG. 5 on the side of the track 8 can be eliminated so that the costs for laying the magnetic rails can be decreased. Moreover, the magnetic rail 16 can be manufactured only from steel so that the problem of electrolytic corrosion can be overcome. Unlike linear induction motors, it is not needed to flow the eddy current through the secondary so that power loss can be decreased to a minimum. In the case of the ground primary system, the armature current must be made to flow through a section longer than a vehicle so that power loss is high. Furthermore, high magnetic energy is required so that the capacity of a power source must be large and in order to decrease the capacity of the power source, the whole line must be divided into a plurality of sections to which power is distributed. As a result, the ground installations including switching devices are expensive, but according to the present invention, the guide electromagnets are used to move a vehicle so that a power supply range and magnetic energy can be decreased to a minimum.

In general, reluctance type motors have a high degree of efficiency but a low degree of power factor, but when a bias magnetic field produced by a bias current is superposed on a thrusting current, the power factor can be improved. That is, in the case of this reluctance type motors, thrust is substantially in proportion to the product of a DC component including a bias current and a maximum value of an AC component. Another reason resides in the fact that effective voltage is substantially in proportion to a DC component while reactive voltage is substantially in proportion to a maximum value of an AC component.

The guide electromagnets 14 are symmetrically mounted on the chassis 3 with respect to the centerline thereof so that when the bias currents at the same magnitudes are made to flow through the right and left guide electromagnets 14, the deviation in neither direction of the vehicle occurs unless the vehicle is turned to the right or left direction. In generally, in order to enhance the tracking capability of the vehicle even if the right and left rails are not properly aligned, the bias current is made to flow both the right and left guide electromagnets 14 so that, as explained above, the power factor in terms of the reluctance type motors can be improved. When thrust is insufficient, the surfaces of the magnetic rail 16 and the supporting electromagnet 15 opposing thereto are formed similarly to those of the magnetic rail and the guide electromagnet so that thrust can be increased. In this case, there is a fear of electromagnetic energy pulsation, but in almost all the speed ranges the frequency is so high that vibrations can be easily insulated by secondary springs and consequently comfortableness to ride is not adversely affected at all.

In the first embodiment, as described about with reference to FIG. 2, the gap G between the adjacent magnetic poles is deviated by $\frac{1}{4}$ pitch from an integer multiple of pitch so that attraction force per one electromagnet is averaged and consequently pulsation of the attraction force is decreased.

However, when a position of a vehicle changes while it is traveling, pulsative rotational force capable of rotating the electromagnet is produced. Since the guide electromagnets 14 are mounted on the chassis 3 symmetrically with respect to the centerline thereof, such pulsative rotational forces on both of the right and left side are cancelled by each other so that no problem arises. However, in the case of the supporting electromagnets 15, in response to variations in position of the vehicle, the pulsative rotational force causes pitching of the chassis 3. As described above, such pulsative rotational force can be absorbed by secondary springs, but they can be avoided by the construction to be described with reference to FIG. 4.

Figure 4:
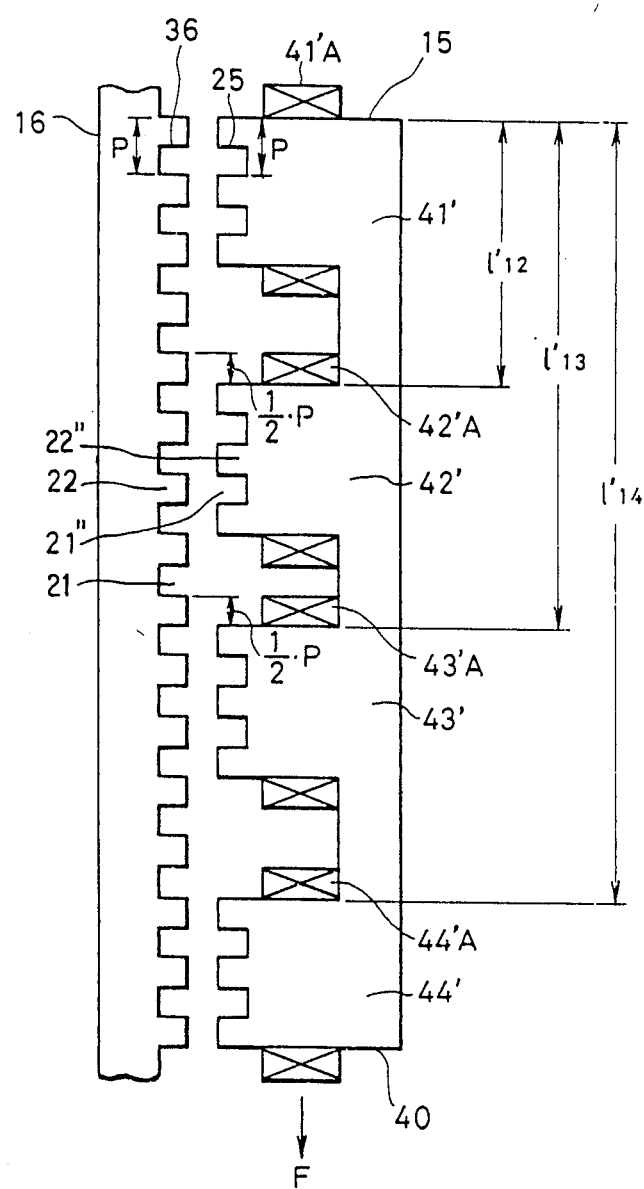
FIG. 4 is a sectional view of another preferred embodiment of the present invention.

FIG. 4 is a sectional view of another preferred embodiment of the present invention in which the present invention is especially applied to the supporting electromagnet 15. The second embodiment is different from the first embodiment described above in that the distance from the magnetic pole 41' to the magnet pole 44'; that is the distance $l'_{14}$ is equal to an integer multiple of pitch P while the distance $l'_{12}$ from the magnet pole 41' to the magnet pole 42' and the distance $l'_{13}$ from the magnet pole 41' to the magnet pole 43' are deviated by $\frac{1}{4}$ pitch from an integer multiple of pitch P. In other words, when the supporting electromagnet 15 is divided into end portions and an intermediate portion therebetween, the distance between the end magnet poles 41' and 44' and the respective adjacent magnet poles 42' and 43' are deviated by $\frac{1}{4}$ pitch, respectively, from integer multiples of pitch P. In the second embodiment, while the currents flowing through exciting coils 41'A and 44'A at both ends of the magnet poles 41' and 44' are simultaneously increased like a pulse shape for a predetermined time interval and then are decreased, the currents flowing through exciting coils 42'A and 43'A are concurrently increased like a pulse shape. That is, the second embodiment utilizes the two-phase excitation method to produce thrust. In the second embodiment, regardless of the position of the vehicle, attraction force acts symmetrically with respect to the center of the supporting electromagnet 15 so that pulsative rotational force resulting from variations in position of the vehicle can be remarkably decreased.

It is to be understood that the second embodiment of the present invention may be equally applied to the guide electromagnets.

The invention has been described in detail with respect to preferred embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

What is claimed is:

1. In an attraction type magnetic levitation vehicle system of the type comprising a magnetic rail laid on the side of a track and a levitation vehicle having a projection type supporting means and a projection type guide means each having a plurality of electromagnets excited by exciting coils, said plurality of electromagnets being arranged along the direction of said track such that a magnetic pole surface of each of said plurality of electromagnets is opposed to a surface of said magnetic rail, respectively, whereby said levitation vehicle is levitated above said magnetic rail without contact therewith by magnetic attraction forces between said magnetic rail and both said supporting means and guide means, the improvement comprising:

said plurality of electromagnets of said guide means being four in number; each of the distances between adjacent ones of the four electromagnets being respectively offset by a distance which is $\frac{1}{4}$ of the distance corresponding to said predetermined pitch from an integer multiple of said predetermined pitch; the distance between a first sequential one of said four electromagnets and a fourth sequential one of said electromagnets is equal to an integer multiple of said predetermined pitch, while the distances between the first and second electromagnets and between the third and fourth electromagnets are respectively offset by $\frac{1}{4}$ of the distance corresponding to said predetermined pitch from an integer multiple of said predetermined pitch;

the magnetic pole surfaces of (a) at least one of said supporting means and guide means and (b) the surface of said magnetic rail opposed to said magnetic pole surfaces each being in the form of a rectangular waveform having a plurality of alternating groove-and-tooth pairs arranged at a predetermined pitch along the direction of said track;

at least one of the distances from one of said plurality of electromagnets which are in the form of a rectangular waveform to a remaining one of said plurality of electromagnets which are in the form of a rectangular waveform being offset from an integer multiple of said predetermined pitch along the direction of said track by a distance which is less than the length of one pitch; respective magnetic pole surface of both said supporting means and said guide means and the surfaces of said magnetic rail opposed to said magnetic pole surfaces having a shape in the form of said rectangular waveform; and means for driving the exciting coils of each of said plurality of electromagnets which are in the form of a rectangular waveform by applying exciting currents, said exciting currents including a DC bias current for imparting magnetic force in a transverse direction to said track and pulse currents having a predetermined timing and sequence, thereby causing thrust to be produced on the levitation vehicle in the direction of said track.

2. An attractive type magnetic levitation vehicle system as claimed in claim 1, wherein relative distances of said plurality of magnetic poles each having said rectangular-wave-shaped magnetic pole surface are offset by less than said one pitch, respectively, from an integer multiple of said predetermined pitch.

3. An attraction type magnetic levitation vehicle system as claimed in claim 1, wherein relative distances of said plurality of magnetic poles each having said rectangular-wave-shaped magnetic pole surface are offset by less than said one pitch, respectively, from an integer multiple of said predetermined pitch.

* * * * *